Feb. 12, 1957   D. RAGLAND   2,781,206
PRESSURE COMPENSATED PIPE COLLAR
Filed May 18, 1953
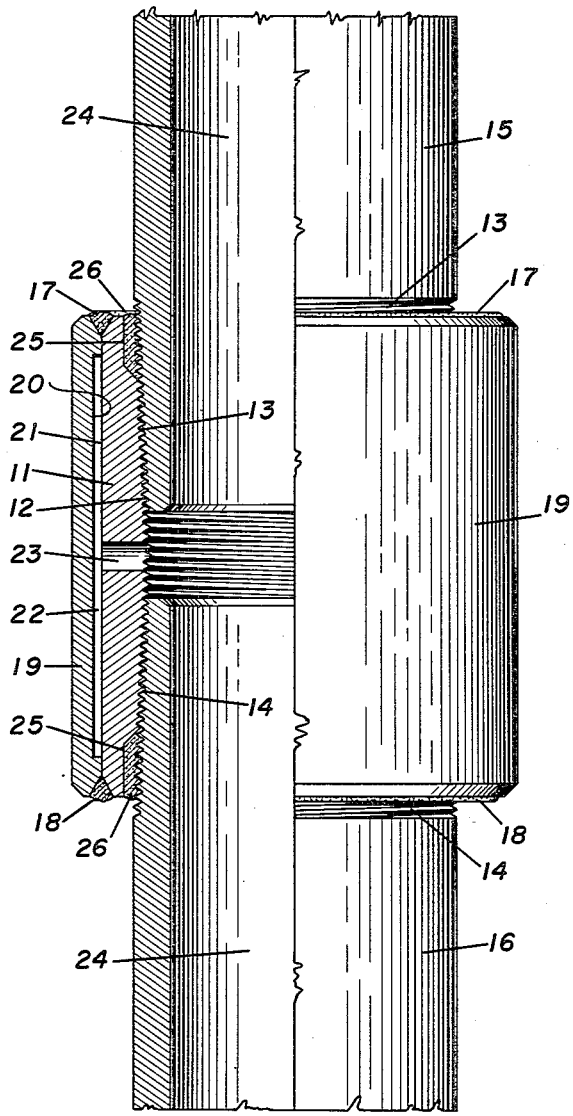
INVENTOR.
Douglas Ragland,
BY
ATTORNEY.

United States Patent Office 2,781,206
Patented Feb. 12, 1957

2,781,206

PRESSURE COMPENSATED PIPE COLLAR

Douglas Ragland, Houston, Tex., assignor, by mesne assignments, to Esso Research and Engineering Company, Elizabeth, N. J., a corporation of Delaware Application May 18, 1953, Serial No. 355,529

1 Claim. (Cl. 285—106)

The present invention is directed to a tubing and casing collar. More particularly, the invention is directed to a collar adapted to be employed in connecting sections of pipe or other tubular members.

In the drilling of oil wells it is necessary to employ a drill string which comprises lengths of drill pipe suitably connected to each other. Through this drill pipe drilling fluid such as mud is circulated under high pressure. The drill pipe is under tension and considerable load is imposed on the connections. In many operations connected with the drilling of oil wells and the producing of oil the connections holding the sections of pipe together are also under considerable tension and high pressure, which may result in the collar or connection expanding due to the high internal pressure and causing leakage at the joints.

The principal parts of the apparatus of the present invention include a first and a second sleeve spaced apart from each other and sealed at each end thereof to define an annular space. The first sleeve is internally threaded so that it will threadably engage with external threads of tubular members such as pipes and the like. The first sleeve defines a port which fluidly communicates the inner surface thereof with the annular space. The first and second sleeves are sealed or connected tightly at first and second ends thereof.

The pipe collar of the present invention is particularly adapted to form a fluid tight conduit with first and second tubular members which are externally threaded to connect into said members.

The invention will be further illustrated by reference to the drawing in which the single figure is a view in partial section of the apparatus of the present invention.

Referring now to the drawing, numeral 11 designates a first sleeve or wall member which is provided with internal threads 12 and is adapted to engage with external threads 13 and 14 respectively of tubular members 15 and 16. Sealed to first wall member or sleeve 11 at ends 17 and 18 is a second wall member 19 which defines with its inner surface 20 and the outer surface 21 of first wall member 11 an annular space 22. First wall member or sleeve 11 defines a port 23 which fluidly communicates annular space 22 with the passageway 24 defined by tubular members 15 and 16. The voids between internal threads 12 and external threads 14 may be filled with a sealing material such as a low melting point solder or alloy 25, a pipe thread dope, and the like, which allows the length of pipe to be made up rapidly and fitted tightly to make a fluid tight connection.

It will be noted that first sleeve or wall member 11 defines a recessed space 25 at each end thereof which suitably may be filled with excess solder 26 comprising a low melting point alloy or alternatively a thermal plastic material, or similar other sealing materials.

It will be seen from the foregoing description that a double wall collar has been provided which prevents the expansion of the collar and separation of threads in the tubing or casing connection. The sleeve assembly on the outside forming an annular space, with each end of the sleeve sealed, is in fluid communication through a port at a center portion of the inside wall member or sleeve which exposes the annular space between the two sleeves to the pressure of the tubing. Thus the pressure in passageway 24 through port 23 is communicated to annular space 22 which allows the pressure within passageway 24 to be exerted on the outer surface of wall member or sleeve 11 and thus on the inside of the threads 12 meshing with threads 13 and 14 forcing the threads 12 and 13 and 14 into sealing contact with the coating of sealing material placed thereon.

A standard 2" eight round threaded API tubing collar was modified as shown in the accompanying drawing and assembled with a sealing material in the void space around the equivalents of the space between threads 12 and 13 and 14. This assembly had a pressure of 7,000 p. s. i. g. imposed on the equivalent of passageway 24 and annular space 22 for a period of 30 days during which time a tight connection was held. Thus expansion of the internally threaded collar was prevented and a fluid tight threaded seal was maintained.

While the present invention may be employed in conjunction with a sealing material such as a low temperature fusible alloy or other thermal plastic material on the threads, it may be used without such coating or may be used with a conventional pipe thread dope since the principle embodied in the present invention allows a tight seal to be maintained by virtue of the pressure from the interior of the tubing being balanced by the pressure from the annular space surrounding the inner wall or sleeve of my improved collar and conduit.

As illustrations of the type of sealing materials which may be used in the practice of the present invention, sealing materials such as solders composed of tin and lead in the respective proportions of 20 to 80 parts of tin to 80 to 20 parts of lead, commercial body filling metal containing lead and antimony such as used in repairing fender dents, Goodyear Thermoplastic Pliobond Nos. 20 and 30, Enjay pipe enamel comprising tarry compounds, red sealing wax such as employed in sealing letters and in home canning, De Khotinsky cements, Glenn F. Martin Company Thermoplastic Formula F 106–154, Seal Peal Inc. Thermoplastic Type H–10–2 and Type 1–1–037, commercial roofing compounds composed of tars of medium viscosity and containing asbestos filler, various grades of waterproof linoleum cements, pipe thread dopes, materials containing graphite, and the like, may be mentioned. It will be seen that the sealing materials finding usage in the practice of the present invention are many and varied. Actually, sealing materials of the type mentioned above have been used successfully whether asphaltic, metallic or resinous in nature.

It is understood that the device of the present invention may be suitably modified and still fall within the spirit and scope of my invention. For example, the wall members 11 and 19 may be constructed integrally with a space 22 between them, omitting the necessity of providing seals for ends 17 and 18 as shown in the drawing. Also the recessed spaces 25 may be omitted without departing from my invention. Likewise the threads 12, 13, and 14 may be coated with suitable sealing materials as may be desired.

The nature and objects of the present invention having been completely described and illustrated, what I wish to claim as new and useful and to secure by Letters Patent is:

A pipe connection adapted for use in high pressure operations comprising a continuous metallic inner sleeve having interiorly threaded ends, a metallic outer sleeve spaced from said inner sleeve and connected to said inner sleeve at the ends thereof to form a chamber, a first metallic pipe member provided with an exteriorly threaded end portion engagedly connected to one threaded end of said inner sleeve, a second metallic pipe member provided with an exteriorly threaded end portion engagedly connected to the other threaded end of said inner sleeve, said chamber extending at least a substantial portion of the length of said threaded connections, said engaged threads being provided with thread sealing material whereby a fluid-tight seal is effected between the threadedly engaged portions of said pipe members and said inner sleeve, said inner sleeve being formed to provide port means positioned between the pipe ends and adapted to fluidly communicate the interior of said pipe members and said chamber whereby when high pressure fluids in said pipe members tend to deform said pipe members adjacent the threaded connections fluid pressure enters said chamber through said port means and offsets the tendency of said pipe members to deform by preventing outward expansion of said inner sleeve and thereby maintains the seal effected originally by said engaged threads and thread sealing material.

References Cited in the file of this patent

UNITED STATES PATENTS

| | | |
|---|---|---|
| 318,925 | Patterson | May 26, 1885 |
| 672,955 | Murrin | Apr. 30, 1901 |
| 1,035,063 | Werner | Aug. 6, 1912 |
| 1,218,895 | Porter | Mar. 13, 1917 |
| 1,761,709 | Davies | June 3, 1930 |
| 1,875,708 | Couhig | Sept. 6, 1932 |
| 2,452,057 | Kehoe | Oct. 26, 1948 |

FOREIGN PATENTS

| | | |
|---|---|---|
| 176,050 | Great Britain | Feb. 27, 1922 |
| 757,506 | France | Dec. 28, 1933 |